Dec. 2, 1947.　　　G. M. GIANNINI　　　2,432,003
CORRECTION OF TRANSMISSION ERRORS
Filed May 15, 1945　　　2 Sheets-Sheet 1

Inventor
GABRIEL M. GIANNINI
Barkelew & Scantlebury
Attys.

Dec. 2, 1947. G. M. GIANNINI 2,432,003
CORRECTION OF TRANSMISSION ERRORS
Filed May 15, 1945 2 Sheets-Sheet 2
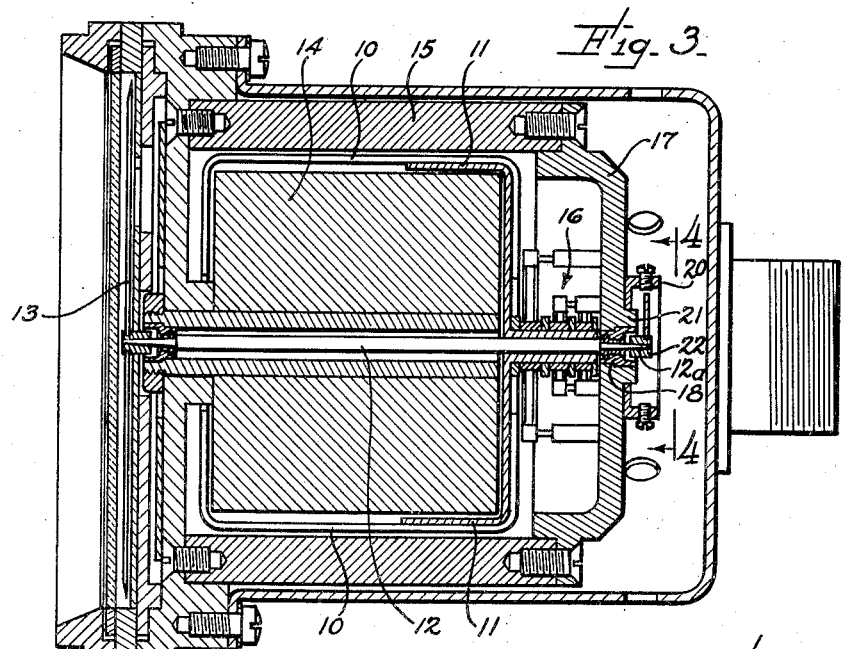
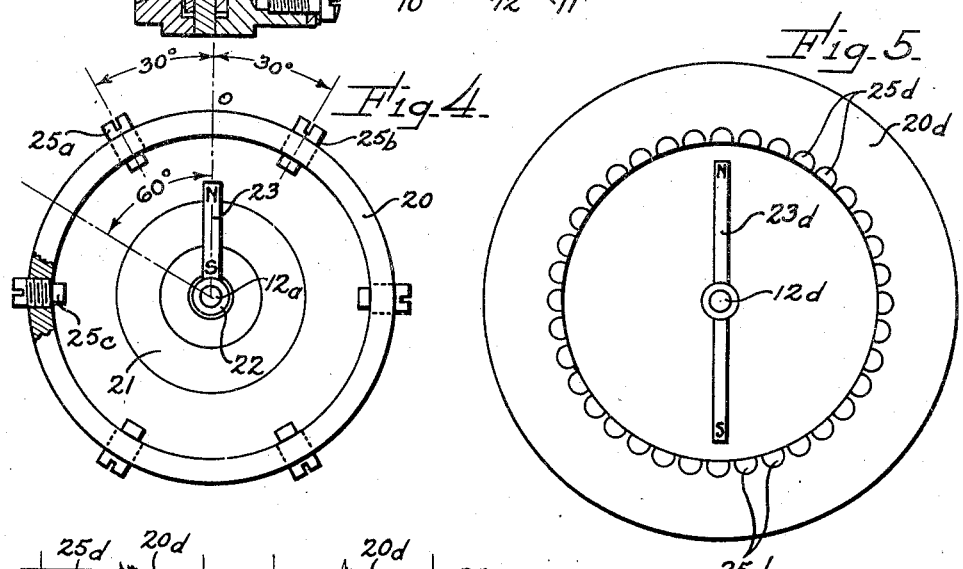
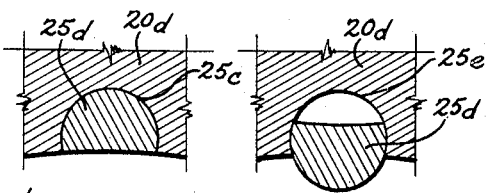
Inventor
GABRIEL M. GIANNINI
Attys.

Patented Dec. 2, 1947

2,432,003

UNITED STATES PATENT OFFICE 2,432,003

CORRECTION OF TRANSMISSION ERRORS

Gabriel M. Giannini, West Los Angeles, Calif., assignor, by mesne assignments, to Howe & Fant, Inc., South Norwalk, Conn., a corporation of Delaware Application May 15, 1945, Serial No. 593,953

5 Claims. (Cl. 318—18)

The general purpose of the present invention is the correction of errors, inequalities or asynchronisms in a transmission system of any type wherein a rotary or other movable element is driven by an effective applied torque or force in such a manner that the torque forces, and/or the response of the driven member to the torque, are not synchronous with, or do not bear the desired relation to, the initial driving member. The correction system has no applicability to a transmission wherein the driver and driven members are positively coupled, only having application to transmissions where the over-all coupling (considered as between the initial driving member and the final driven member) is non-positive and allows or causes deviations from synchronism or from the ideal relationship which may be desired as between the driver and driven members.

The invention is not limited to particular application to any particular transmission system; but the application of the invention to remote control systems of the Selsyn type in which the movements are rotative is typical and illustrative of the invention itself. Accordingly I give the following detailed explanation of the invention as applied to such a transmission system, but without necessary limitation thereto. As applied to such a system, where the ideal angular relationship between transmitter and receiver is an accurately synchronous relation, my correction system modifies the movement of the receiver to correct the inherent torque errors of the Selsyn system to achieve the ideal angular relationship. In the accompanying drawings Fig. 1 is a diagram of the electrical circuiting of a typical Selsyn system.

Fig. 4 is a fragmentary enlarged elevation taken as indicated by line 4—4 on Fig. 3 and showing the correction devices;

Fig. 5 is a similar elevation showing a modified form;

Figs. 6 and 7 are enlarged fragmentary details illustrating the structure shown in Fig. 5, and Fig. 8 is a diagram illustrative of the action of such a correction device as is shown in Fig. 5.

Figure 1:
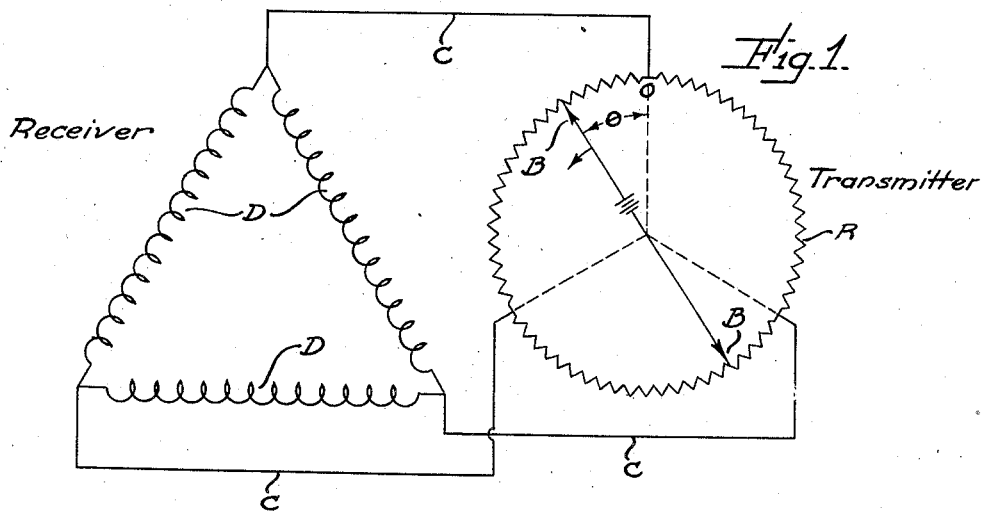

Fig. 1 shows the essential electrical circuiting of a typical Selsyn transmission system, consisting essentially of a circular resistance unit R to which potential is applied by diametrically opposed brushes B, and which is connected by three-wire circuit C to the delta windings D of a receiver. Theoretic investigation, checked by laboratory tests, has shown that such a system, in addition to errors of a residual nature and errors caused (in a compass system) by deviation, etc., has certain inherent errors of asynchronism which are repetitive in cycles of 60°. Considering the angle of rotation of a transmitter counterclockwise from the position marked zero in Fig. 1 (the angle indicated as $\theta$) the inherent errors in the system through one 60° cycle are plotted in Fig. 2, where the receiver error in degrees is plotted against the transmitter angle, as shown by the plotted curve A. As there shown, the receiver lags the transmitter through the first 30° of transmitter rotation, and then leads the transmitter through the ensuing 30° of transmitter rotation; the cycle being repeated through each successive 60° of transmitter rotation. The lag and lead of the receiver are symmetric with relation to the 30° position, and maximum receiver error of 1° 6' occurs at transmitter angles of 13° 18' and 46° 42' measured from the zero position or from any succeeding 60° position.

Figure 3:
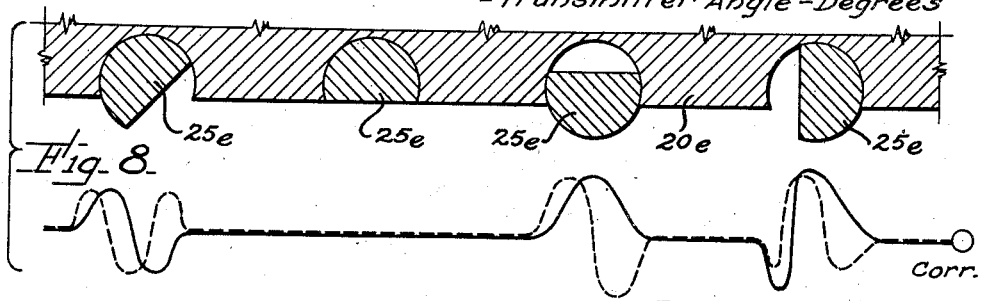
Fig. 3 is a longitudinal section of a typical receiver for use in a remote control compass system, equipped with the correction devices of my invention.

Fig. 3 shows a receiver structure of my design adapted to be used in a Selsyn compass repeater system. As there shown, the receiver coils 10 are rotatably carried by a supporting structure 11 on a central longitudinal rotatable shaft 12 which carries pointer 13 at its forward end. The coils rotate in the gap between permanent magnets 14 and 15 which are fixed in the case. The electrical connections to the rotating coils are provided by the collector ring and brush structure shown at 16, the brushes being mounted on the inside of a cap 17 which is secured to and supported on the outer magnet element 15. Central shaft 12 is journalled at its rear end in a bearing 18 in cap 17; and for the purposes of my present invention the shaft is extended at 12a through the bearing and beyond the rear face of cap 17.

For the correction of the inherent repetitive errors which have been discussed, I provide correction devices such as are shown in Figs. 3 and 4. An annulus 20 of any suitable material, either non-magnetic or para-magnetic, such as soft iron, is mounted on a hub boss 21 projecting from the rear face of cap 17, so that the annulus is concentric with shaft extension 12a. The annulus may either be mounted in a predetermined fixed position, or may be rotatively adjustable about the axis of the shaft.

On the shaft extension, by means of a mounting hub 22 or similar device, I mount a small radially extending magnet 23, preferably a permanent magnet. One polar end of magnet 23 lies inside annulus 20 with a radial clearance such as proportionately indicated in Figs. 3 and 4. Both the magnet 23 and the correction elements 25 are of restricted dimensions in a circumferential direction (thickness) so as to concentrate their magnetic fields.

Mounted in and projecting through the annulus are six magnetic correction elements, preferably radially adjustable, and preferably in the form of adjustable screws 25 with axes radial of the shaft and spaced 60° apart around the shaft and annulus. These correction screws are of magnetic material, either individually magnetized or merely of magnetic permeable material. The latter is preferred, with the screws of soft iron or steel. If the screws are merely of magnetic permeable material or if they are magnetized to present at their inner ends polarities opposite to the polarity presented by magnet 23, or if member 23 be merely magnetically permeable and the screws magnetized, then there is an attractive action between member 23 and the screws. The immediately following explanation of the corrective action of my system will be based upon the assumption of such an attractive action; the utilization of repulsive action will be spoken of later.

Assuming the action to be attractive, and assuming for instance that Fig. 4 shows a position of magnet 23 when the transmitter and receiver are in positions corresponding either to the zero position indicated in Fig. 1 or any position removed therefrom by 60° or a multiple of 60°, the relative positions of the correction screws will be as shown in Fig. 4, that is, at positions of 30°, 90°, etc. Thus, assuming that Fig. 4 shows magnet 23 standing in the zero position, then in that position one correction screw 25a will be located 30° from that zero position in a counter-clockwise direction, and another correction screw 25b will be located in a position 30° removed clockwise from that zero position. And a 60° angle of counter-clockwise rotation, corresponding to the 60° angle of the diagram of Fig. 2, is indicated in Fig. 4.

It will be immediately apparent from consideration of Fig. 4, that, with magnet 23 standing in zero position or in any of its successive 60° positions, the magnetic torque forces on magnet 23 are balanced, and the net corrective torque on the magnet is zero. Also, when the magnet stands in any position directly opposite one of the correction screws, the magnetic corrective torque force is zero. Between these successive positions in which the magnetic torque force is zero, that force varies between zero and a maximum.

For example, consider the action as magnet 23 rotates in a counter-clockwise direction from the zero position shown in Fig. 4. As the magnet approaches correction screw 25a, the attractive force between the magnet and that screw increases, while the attractive force between the magnet and screw 25b decreases. As the magnet approaches screw 25a the magnetic attraction of that screw becomes predominant and increases until the magnet reaches a position at a determinable angle from the screw, and then decreases as the magnet further approaches screw 25a, becoming zero again as the magnet lines up radially with that screw. Thus, there is a maximum of counter-clockwise torque applied to magnet 23 at some point in its approach to screw 25a, followed by a zero torque as the magnet reaches the 30° position opposite screw 25a. Then on further counter-clockwise movement away from screw 25a and toward screw 25c there is a similar attractive action between the magnet and screw 25a, with a maximum of magnetic torque occurring when the magnet has reached a position at that same determinable angle past the screw, but now exerting a torque in a clockwise direction. And then when the magnet reaches the 60° position, half way between screw 25a and screw 25c, the net curve torque on magnet 23 again becomes zero. Then, on passing the 60° position and on approaching and passing screw 25c, the cycle of changing magnetic torques on magnet 23 is repeated during the ensuing 60° rotation of magnet 23. And, as will be seen without repetition, the cycle is repeated for each successive 60° of rotation of magnet 23. Thus, during the first 30° of rotation of the receiver, from zero position or from any succeeding 60° position, when the receiver error is negative (lagging) the correction device applies a forwardly rotating correcting torque to the receiver to correct that error. And in the ensuing 30° of receiver rotation, where the receiver error is positive (running ahead) the correction device applies a negative or rearwardly rotating torque to the receiver to correct that error. At the zero position, and at each successive 30° position where the receiver error is zero, the magnetic corrective torque is also zero.

Figure 2:
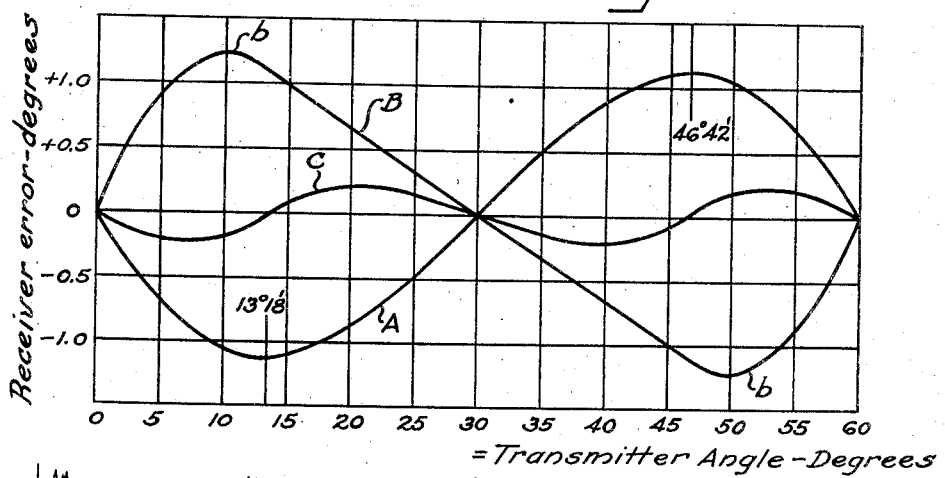
Fig. 2 is a plot showing errors inherent in such a system, and their correction by my system.

It may be observed that the simple correction devices shown in Fig. 4 will not exactly correct the whole of the inherent error shown in Fig. 2, but the inherent error may be very substantially reduced, or reduced to a comparatively negligible quantity, by proper choice of the constants and variables involved in the correction device. A complete analysis of all of the magnetic torque forces acting on magnet 23 shows that the shape of the curve of the net correction torque, plotted against angular movement, depends on the ratio of the radial length of magnet 23 (the radius of its outer polar end from the center of shaft 12a) to the radial distance of the inner ends of the correction elements (screws 25) from the center. If we call the first dimension $l_1$ and the second $l_2$, then the shape of the correction torque curve and the rotational lengths at which the maximum correction torques occur depend on the ratio $l_1/l_2$. For instance in Fig. 2 where a typical correction torque is shown by curve B, the maxima at $b$ are moved toward each other (the left-hand maximum $b$ is moved toward the right, and the maximum $b$ toward the left) as the ratio $l_1/l_2$ is made smaller. Reduction in that ratio (for instance by moving screws 25 outwardly) also, of course, decreases the amplitude of the maxima. The maxima however can be controlled independently of the shape of the correction torque curve by increasing the quantity $q_1q_2$, where $q_1$ represents the magnetic charge on the screw and $q_2$ the charge on the magnet end. Thus, for the correction of such an error as shown in curve A of Fig. 2, the best practicable shape for the correction torque curve B can be determined by properly fixing the ratio $l_1/l_2$, and then the best practicable maxima can be determined by choosing proper magnetic charges for the elements 23 and 25. For instance, a ratio of $$\frac{l_1}{l_2} = \frac{3}{4}$$

gives a magnetic torque correction curve of such a shape as shown at B in Fig. 2, with maxima $b$ occurring at about 10° and 50°.

With the shape of curve B and the maxima positions thus fixed, the amplitudes of the maxima are fixed by proper choice of the quantity $q_1q_2$. The choice of that quantity will of course depend on the magnitude of the restoring torque forces involved in the system which is being corrected. For instance, in a typical Selsyn system where the maximum restoring torque forces are about 0.1 mm. g. per degree, and with the ratio $$\frac{l_1}{l_2} = \frac{3}{4}$$

the quantity $q_1 q_2$ to give such relative maxima as is indicated in Fig. 2, is found to be about 3 (E. M. U.)$^2$. And that quantity can be supplied, for instance, by utilizing a magnet 23 magnetized to a charge of about 30 E. M. U. and screws 25 of soft iron or steel and having inner polar ends of about $\frac{1}{16}''-\frac{1}{8}''$ diameter. With the curve of the correction torque established as shown at B in Fig. 2, the final net error curve of the receiver is shown by curve C in Fig. 2; the maximum error having been reduced from 1° 6′ to about 15′ or less.

In the instance which is specifically shown in the drawings (magnet 23 is not an element of the Selsyn system itself) the desired value for the product quantity $q_1 q_2$ may of course be made up of any suitable values of $q_1$ and $q_2$ that will give the desired product. The above figures are typical; and the value given for $q_2$ is a typical value for a magnet which forms an element of a Selsyn receiver which has a restoring torque such as stated. As is expressed elsewhere, my correction devices may be applied as well to a magnet which is an element of the system as to a special magnet such as shown at 23. In that instance, the value of $q_2$ being fixed, the desired value of the quantity $q_1 q_2$ will then be attained by the proper choice of the quantity $q_1$.

The foregoing illustrative figures of correction have been given on the basis of the assumption that ring 20 is of non-magnetic material, so that the correction screws 25 are spacedly isolated, so to speak. The action is generally the same as above described if ring 20 is of magnetic permeable material, except that in such an arrangement the magnetic corrective action of the several screws becomes zero if the screws are withdrawn to a position flush with the inner surface of the ring, and that, to reach any given chosen maxima of corrective torque, the charge quantity $q_1 q_2$ is larger.

The foregoing description of operation has also been based upon the assumption that the action between members 23 and 25 is attractive. If those several members be so polarized that the spaced correction elements 25 present inner poles of polarities the same as that presented by magnet 23, so that the action becomes repulsive, the only change which need to be made in the correction system is that correction elements 25 should then be placed at the zero position and at the successive 60° positions, instead of at the positions of 30°, 90°, etc., as shown in Fig. 4.

It may also be observed that the several adjustable correction screws such as shown in Fig. 4 are, when once adjusted for a correction of any given instrument, the full equivalent of predetermined fixed magnetic projections or irregularities in an annulus of para-magnetic material; or are predetermined fixed localized and spaced bodies of magnetic material, if the annulus 20 be considered to be of non-magnetic material.

It can readily be understood without detailed demonstration that if an infinite number of correction elements 25 were to be placed in infinitesimal spacing about the annulus, then, by proper radial placements or adjustments of the elements a correction force curve to quite exactly correct any error curve, can be effected. By using a fairly large number of the correction elements, that ideal may be approached sufficiently closely for all practical purposes; and in Figs. 5, 6 and 7 I show correction devices embodying a large number of correction elements and also embodying other modifications in design.

In Fig. 5 an annulus 20d is illustrated, concentrically surrounding a rotatable magnetic element 23d, which in this illustration projects radially in opposite directions from shaft 12d. I may here remark that the magnet 23 of Fig. 4 may likewise be double, and that of Fig. 5 may be single. Annulus 20d may be either of magnetic or non-magnetic material, and it may be an annulus which is especially provided for correction purposes or it may be an annulus which exists for other functions in the instrument which is to be corrected. And magnetic element 23d may represent any magnetic element either in the instrument or especially provided. These same observations apply to Fig. 4.

In the modifications shown in Fig. 5, instead of radially adjustable screws, I show a plurality of closely spaced partial cylindric insets 25d of magnetic permeable material, set in partial cylindric recesses 25e in the inner face of the annulus. As shown in Figs. 6 and 7, the inserted elements may be rotated between the two extreme positions illustrated, and set either in those positions or in any intermediate position. In various positions, the centers of mass, or what may be regarded as the magnetic centers of the elements, are adjusted to different radial positions with respect to center 12d and with respect to magnetic element 23d. And by proper adjustment the correction torques exerted by each of the elements may be adjusted to any value within the maximum torque range for which the correction device is designed; and a correction curve of substantially any character may be effected. In this manner residual errors and other errors which are peculiar to an individual instrument and which are non-repetitive in nature may be corrected. And it may be observed that the adaptability of my correction system to errors which are individual and peculiar to an individual instrument or device, is one of the characteristic advantages of my system of correction. In Selsyn systems, for instance, it has been proposed to introduce corrections in the electrical circuiting of a transmitter; and while it is theoretically possible to correct receiver errors in that manner, no standardized correction system of that type can correct minor or individual errors which are peculiar to the receiver itself; which my system of correction can accomplish.

Fig. 8 is a diagram representing graphically some of the correction effects which may be had with a device embodying adjustable magnetic elements, such for instance as those shown in Fig. 5. Fig. 8 shows several inserts 25e in typical positions in a magnetic body 20e; and directly under each insert the full line curve represents the deviation from average of the magnetic torque exerted by the several inserts on a passing magnetic charge; and the dotted line curve represents the resulting correction torques which are exerted.

Without detailed description, it will be readily understood that the physical arrangement of my correction devices may be reversed. I have described a device composed of two relatively rotatable units—the element 23 or 23d and the circular arrangement of correction elements 25 or 25d; with the unit 23 mounted on the shaft to rotate. The same functions will be performed if unit 23 is relatively stationary and the unit comprising elements 25 rotates in connection with the shaft. And also, my correction system may be applied to movements other than rotational. In fact it may be applied to correct errors, or to introduce modifications of the movements of any member or instrument, cyclically or otherwise, where that member or instrument is not driven positively.

I claim:

1. In a receiver for use in a transmission system, the combination of means for maintaining a magnetic circuit having an air gap, a coil mounted for rotation within the air gap and adapted to move to different positions as current is supplied thereto, and means for correcting the position of the coil as current is supplied to it, including a pair of magnetic charge carrying units, one being connected to the coil to rotate with it and the other being stationary and disposed about the path of travel of the rotatable unit in magnetically effective relation thereto.

2. In a receiver for use in a transmission system, the combination of means for maintaining a magnetic circuit having an air gap, a shaft mounted for rotation, a coil fast on the shaft and lying within the air gap, the coil and shaft being adapted to rotate to different positions as current is supplied to the coil, and means for correcting the position of the coil and shaft as current is supplied to the coil, including a pair of magnetic charge carrying units, one being stationary and the other connected with the shaft to rotate with it in magnetically effective relation to the stationary unit.

3. In a receiver for use in a transmission system, the combination of means for maintaining a magnetic circuit having an air gap, a shaft mounted for rotation, a coil fast on the shaft and lying within the air gap, the coil and shaft being adapted to rotate to different positions as current is supplied to the coil, and means for correcting the position of the coil and shaft as current is supplied to the coil, including a magnetic member fast on the shaft outside the air gap and a plurality of magnetic elements disposed in a circular series along the path of travel of the member and adjustable to vary their effect on the member.

4. In a receiver for use in a transmission system, the combination of means for maintaining a magnetic circuit having an air gap, a shaft mounted for rotation, a coil fast on the shaft and lying within the air gap, the coil and shaft being adapted to rotate to different positions as current is supplied to the coil, and means for correcting the position of the coil and shaft as current is supplied to the coil, including a magnetic member fast on the shaft, a ring encircling the member, and a plurality of magnetic elements mounted in angularly spaced relation about the ring and adjustable to vary their effect on the member.

5. In a receiver for use in a transmission system, the combination of means for maintaining a magnetic circuit having an air gap, a shaft mounted for rotation, a coil fast on the shaft and lying within the air gap, the coil and shaft being adapted to rotate to different positions as current is supplied to the coil, and means for correcting the position of the coil and shaft as current is supplied to the coil, including a magnet fast on the shaft and extending outwardly therefrom, and a plurality of magnetic elements disposed in a circular series about the path defined by the outer end of the magnet as it rotates with the shaft, the elements being adjustable with relation to said path to vary their effect on the magnet.

GABRIEL M. GIANNINI.

REFERENCES CITED

The following references are of record in the file of this patent:

UNITED STATES PATENTS

| Number | Name | Date |
|---|---|---|
| 217,014 | Longfellow | July 1, 1879 |
| 457,161 | Knudsen et al. | Aug. 4, 1891 |